C. FOULK.
Bee-Hives.
No. 156,147.  Patented Oct. 20, 1874.
FIG I
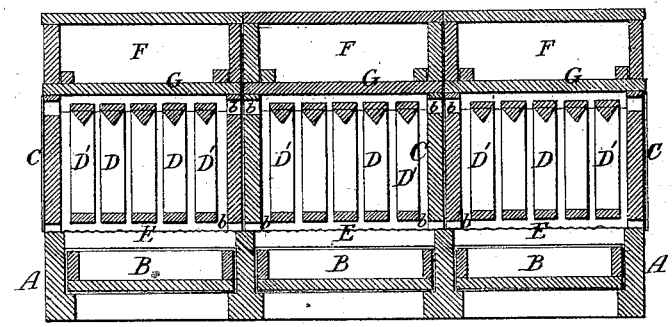
FIG II
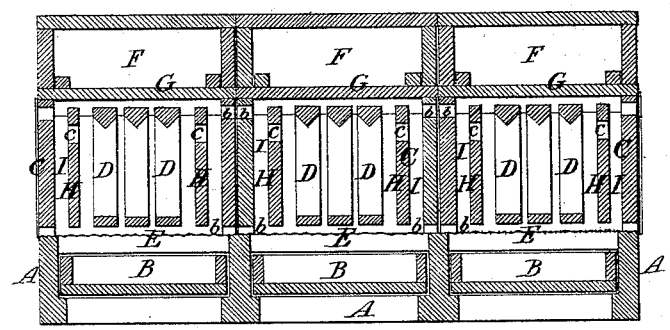
FIG III
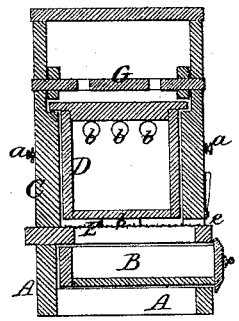
WITNESSES
J A Rutherford
John E Laing
INVENTOR
Charles Foulk
by Johnson and Johnson
his Attys

UNITED STATES PATENT OFFICE.

CHARLES FOULK, OF MARION, IOWA.

IMPROVEMENT IN BEE-HIVES.

Specification forming part of Letters Patent No. 156,147, dated October 20, 1874; application filed June 19, 1874.

*To all whom it may concern:*

Be it known that I, CHARLES FOULK, of Marion, in the county of Linn and State of Iowa, have invented a new and useful Improvement in Cabinet Bee-Hives, of which the following is a specification:

The object of my invention is to afford protection for the bees from the frost in the winter, by combining with the boxes both fixed and removable comb-frames, and having the latter interchangeable with boards perforated at the top for ventilation, and forming a walled-end air-chamber in each box, whereby the hive may be adapted for the cold season, and the bees protected, as will be hereinafter more fully described.

In the accompanying drawings, Figure 1 represents a vertical longitudinal section of a cabinet bee-hive, embracing my invention; Fig. 2, a similar section, showing the interchangeable solid partition-boards inserted in the boxes, to form dead-air chambers, to isolate the middle portion of each box from cold and frost; and Fig. 3, a cross-section.

The special objects and advantages of my invention are to increase the stock without exposing the bees; to exclude the moth from the boxes by providing the cabinet base with drawers for trash; and by providing means by which each box is made to protect the swarm from cold and frost, as the bees, clustering to the center of the hive in winter, leave the filled end comb-frames free for removal, and the formation in their stead of walled air-chambers, without interrupting the proper ventilation of each box.

The base A is a closed cabinet, provided with drawers B, fitting in separate divisions, and upon its open top are grouped three or more boxes, C, in which are arranged comb-frames, D, and bottom wire-screens E, which fit over the openings in the cabinet or base. These boxes C are surmounted with the usual surplus honey-boxes F, with intervening slatted boards G, which form caps to the comb-frames and the air-chambers.

The cabinet-drawers receive the trash that may be cut down by the bees, and are designed to be used at times partly open for the entrance of the moth, and for the deposit of her eggs, the bottom screens giving full protection against their entrance into the boxes from below, and affording full ventilation.

The boxes C are secured and held closely together by hooks $a$, and they communicate with each other by openings $b$ at the top and bottom, which may be closed by slides. In addition to the end openings $b$, they also have side apertures $e$, and these with the end openings are fitted with doors. The comb-frames, except the two outside ones, D', are fixed to each box, but those D' are made removable, to give place to solid partition-boards H, which are used only when the comb-frames are filled with honey, and the bees gather toward the center of the box in cold weather, when the two end filled combs are removed, and replaced by the solid boards D', arranged close to the next inner comb, and form thereby dead-air chambers I at each end of each box, which excludes the cold and frost from the bees, and still allow proper ventilation by means of perforations $c$ in the upper portion of these wall-boards, as shown in Fig. 2.

Each box is complete in itself, and can be removed, when filled, without having the swarm come out. The grouping of the boxes upon the cabinet base affords this material advantage by placing an empty box on the cabinet beside the filled one, opening the apertures between them, and closing the outer door of the full box, and compelling the bees to work through the empty box. When the empty box is filled remove it to the end of the cabinet and replace it with another empty box.

Young swarms will not come out as long as empty boxes are supplied. When one cabinet is full, remove as many boxes as have distinct swarms, and start a new cabinet.

This interchanging of hives upon a cabinet and the shifting of the end honey-comb frames to form walled air-chambers in each hive are of very great advantage in increasing the stock and preserving the swarm.

Each box is provided with two solid boards for use in forming the air-chamber, as above stated.

I claim—

The combination of the boxes C, with the fixed and removable comb-frames D D', the latter interchangeable with the board H, perforated at its upper portion for ventilation, and forming a walled-end air-chamber, I, in each box, as and for the purpose set forth.

CHARLES FOULK.

Witnesses:
SAML. DANIELS,
SAML. N. GOODHUE.